(12) United States Patent
Adachi

(10) Patent No.: US 10,571,777 B2
(45) Date of Patent: Feb. 25, 2020

(54) IMAGING APPARATUS

(71) Applicant: CANON KABUSHIKI KAISHA, Tokyo (JP)

(72) Inventor: Keisuke Adachi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/150,364

(22) Filed: Oct. 3, 2018

(65) Prior Publication Data

US 2019/0107767 A1 Apr. 11, 2019

(30) Foreign Application Priority Data

Oct. 6, 2017 (JP) ................................ 2017-195669

(51) Int. Cl.
G03B 13/06 (2006.01)
G03B 13/10 (2006.01)
H04N 5/225 (2006.01)

(52) U.S. Cl.
CPC ............. *G03B 13/06* (2013.01); *G03B 13/10* (2013.01); *H04N 5/22525* (2018.08)

(58) Field of Classification Search
None
See application file for complete search history.

(56) References Cited

U.S. PATENT DOCUMENTS

| 2014/0300791 | A1* | 10/2014 | Shirono | H04N 5/23293 348/333.06 |
| 2015/0029380 | A1* | 1/2015 | Noh | G03B 13/02 348/333.01 |
| 2017/0187964 | A1* | 6/2017 | Sato | G03B 17/04 |
| 2019/0107767 | A1* | 4/2019 | Adachi | G03B 13/06 |

FOREIGN PATENT DOCUMENTS

JP 03-001765 A 1/1991

* cited by examiner

*Primary Examiner* — William B Perkey
(74) *Attorney, Agent, or Firm* — Cowan, Liebowitz & Latman, P.C.

(57) ABSTRACT

An imaging apparatus includes an electronic viewfinder unit that includes an image display element configured to display an image, an eyepiece optical system configured to enable the image to be observed from a rear side of the imaging apparatus, and a holder unit configured to hold the eyepiece optical system and the image display element. The holder unit moves the eyepiece optical system from a retracted position in which the eyepiece optical system is retracted in a body of the electronic viewfinder unit to an observable position in which the eyepiece optical system projects from the body of the electronic viewfinder unit to the rear side from the retracted position, and moves the image display element to the rear side.

6 Claims, 7 Drawing Sheets

IMAGING APPARATUS

BACKGROUND OF THE INVENTION

Field of the Invention

The present invention relates to an imaging apparatus (image pickup or capturing apparatus) having an electronic viewfinder.

Description of the Related Art

Such an imaging apparatus is disclosed in Japanese Patent Laid-Open No. ("JP") 03-001765. The electronic viewfinder in this imaging apparatus includes a viewfinder body having an image display element and an eyepiece barrel having a diopter adjustment function, wherein the eyepiece barrel can move in the optical axis direction relative to the viewfinder body (image display element).

However, the electronic viewfinder disclosed in JP 03-001765 allows only the eyepiece barrel to move and has a small draw-out or projection amount of the eyepiece barrel from the viewfinder body. Therefore, the nose of the user viewing through the eyepiece barrel may interfere with the imaging apparatus body holding the viewfinder body and the liquid crystal panel provided on the rear side thereof.

SUMMARY OF THE INVENTION

The present invention provides an imaging apparatus that can increase a projectable amount of an eyepiece part (eyepiece optical system) from an imaging apparatus body.

An imaging apparatus according to one aspect of the present invention includes an electronic viewfinder unit that includes an image display element configured to display an image, an eyepiece optical system configured to enable the image to be observed from a rear side of the imaging apparatus, and a holder unit configured to hold the eyepiece optical system and the image display element. The holder unit moves the eyepiece optical system from a retracted position in which the eyepiece optical system is retracted in a body of the electronic viewfinder unit to an observable position in which the eyepiece optical system projects from the body of the electronic viewfinder unit to the rear side from the retracted position, and moves the image display element to the rear side.

Further features of the present invention will become apparent from the following description of exemplary embodiments with reference to the attached drawings.

DESCRIPTION OF THE EMBODIMENTS

A description will now be given of embodiments according to the present invention with reference to the accompanying drawings.

Figure 1:
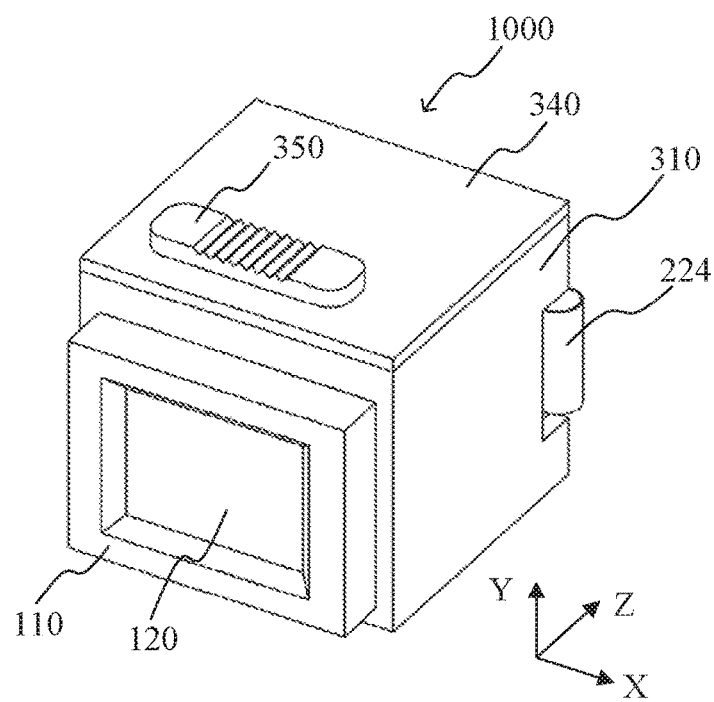
FIG. 1 is a perspective view of an electronic viewfinder unit provided to a camera according to an embodiment of the present invention.
Figure 2:
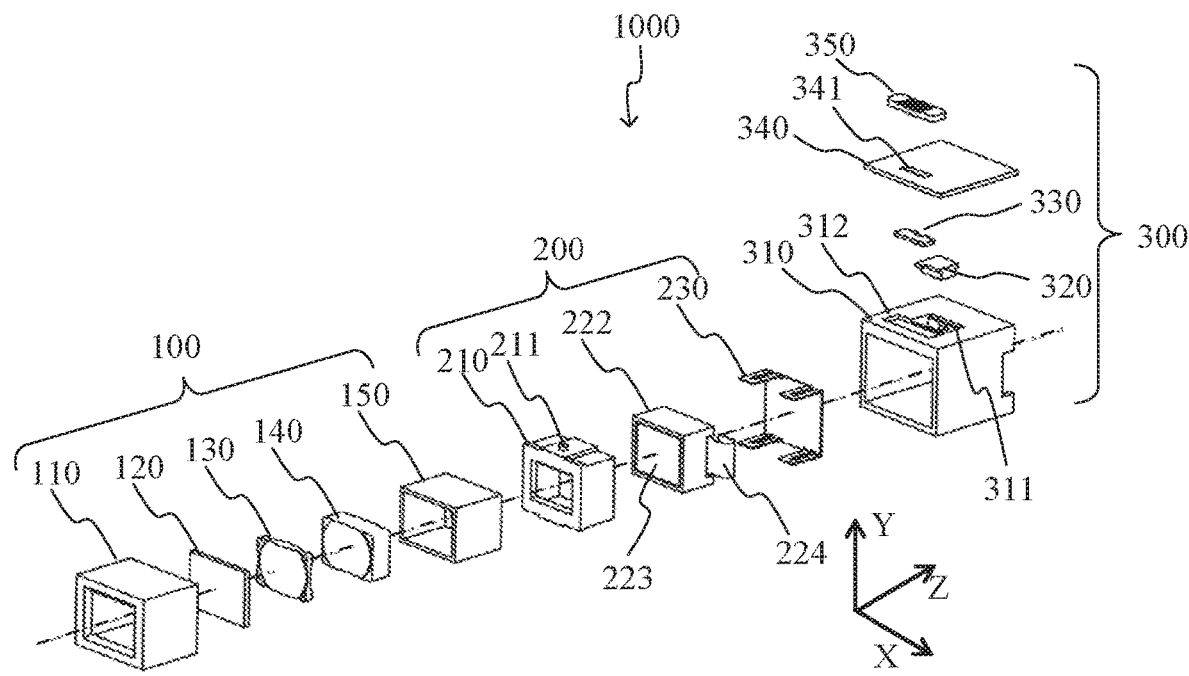
FIG. 2 is an exploded perspective view of the electronic viewfinder unit.

FIGS. 1 and 2 illustrate an electronic viewfinder unit 1000 mounted on an imaging apparatus (hereinafter referred to as a camera) according to an embodiment of the present invention. Referring now to FIG. 2, a description will be given of a configuration of the electronic viewfinder unit 1000.

Reference numeral 100 denotes an eyepiece unit constituting an eyepiece part that includes a lens cover 110, a protective window 120, two lenses (eyepiece optical systems) 130 and 140, and a lens holder 150. The protective window 120, the lens 130, and the lens 140 are arranged in this order from the rear side (or backside) of the camera to the object side (or front side).

The protective window 120 housed and held by the lens holder 150 and the two lenses 130 and 140 are fixed inside the lens cover 110. The protective window 120 prevents dust from entering the lens holder 150 and protects the lens 130. This embodiment makes the protective window 120 of a parallel plate, but may make it of a lens shape as an optical component in the eyepiece optical system closest to the rear side (eyepiece side). This configuration improves the degree of freedom of optical design, promotes the miniaturization, and enhances the performance.

Reference numeral 200 denotes a panel unit that includes a panel holder 210 as an element holder, an image display panel 221 as an image display element, a dustproof member 222, and a panel cover 230. The image display panel 221 housed and held by the panel holder 210 and the dustproof member 222 are fixed inside the panel cover 230. The image display panel 221 can use an organic EL device, a liquid crystal element, or the like. The dustproof member 222 holds a cover plate 223 that closes an opening in the panel holder 210 on the (front) side opposite to the side used to hold the image display panel 221. The image display panel 221 displays as a finder image an electronic image generated by image capturing with an unillustrated image sensor provided in the imaging apparatus. This finder image is magnified by the lenses 130 and 140 and presented to the eye of the user. This configuration enables the finder image to be observed on the rear side of the imaging apparatus. In FIGS. 1 and 2, reference numeral 224 denotes a flexible substrate connected to the image display panel 221.

Reference numeral 300 denotes a base unit that includes a base member 310, a cam member 320, a slider 330, a base plate 340, and a lever member 350. The base member 310 is fixed onto a body of the camera (referred to as a camera body hereinafter), and has a groove portion 311 that holds the cam member 320 slidably in the X direction (horizontal direction) in the figure, and a groove portion 312 that slidably holds the slider 330 in the X direction. The cam member 320 and the slider 330 are engaged with each other and are integrally movable in the X direction. The movements of the cam member 320 and the slider 330 in the Y direction are restricted (prevented) by the base plate 340 fixed onto the base member 310.

The lever member 350 as an operation member is held slidably in the X direction by a penetrating groove portion 341 formed in the base plate 340. The movement of the lever member 350 in the Y direction is restricted since it is coupled to the slider 330 via the base plate 340. In this configuration, as the lever member 350 is operated (moved) in the X direction, the cam member 320 moves in the X direction via the slider 330. This configuration can provide a diopter adjustment as described later.

The lens unit 100 and the panel unit 200 are held movably in the Z direction (optical axis direction of the eyepiece optical system) by the base member 310. Thereby, a holder unit holds the lens unit 100 and the panel unit 200 movably in the Z direction.

Figure 3A:
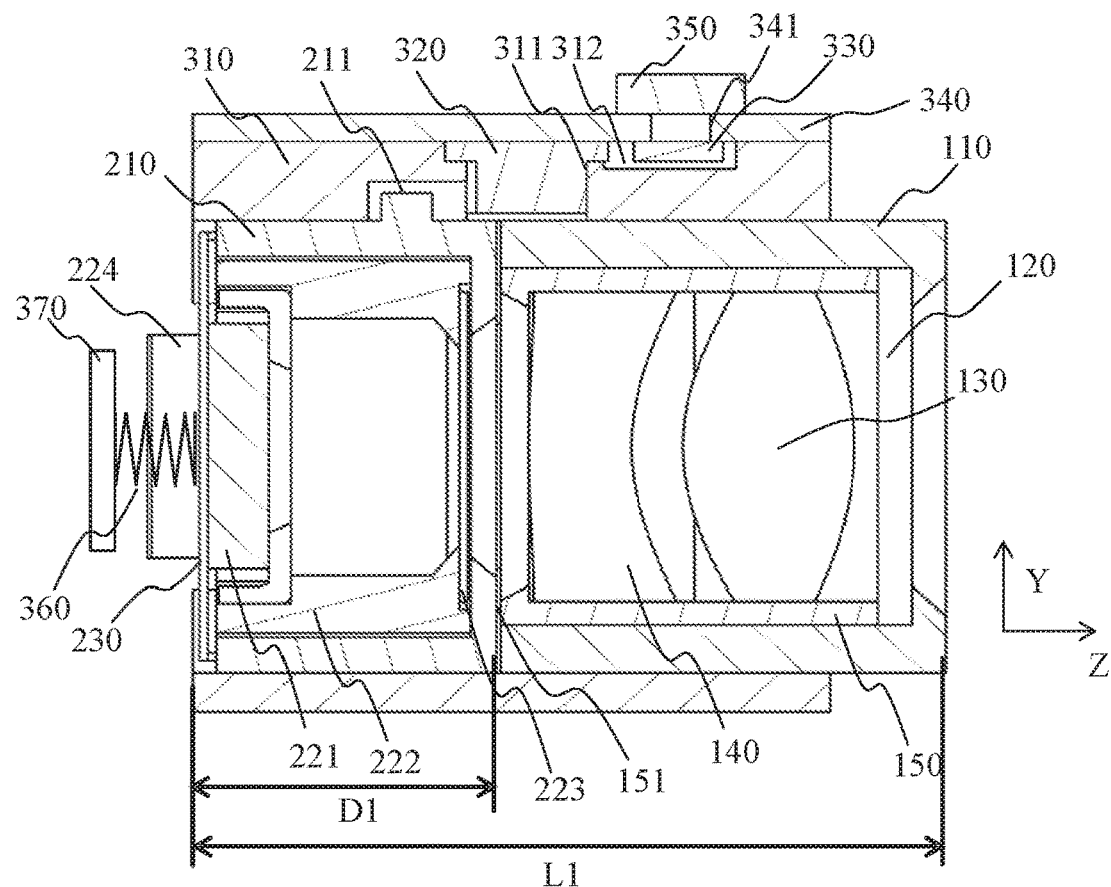
FIGS. 3A and 3B are sectional views of the electronic viewfinder unit in a retracted state.
Figure 6A:
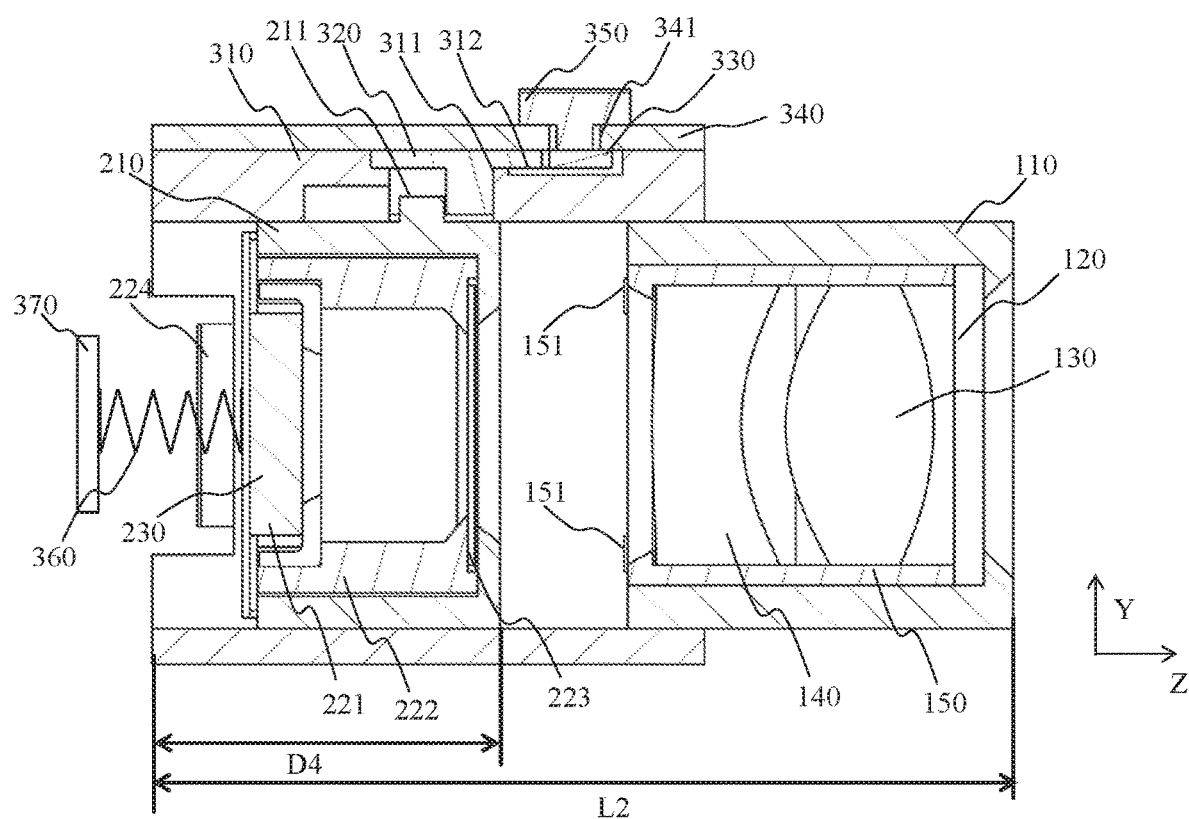
FIGS. 6A and 6B are sectional views of the electronic viewfinder unit in a minus (negative) diopter state.
Figure 6B:
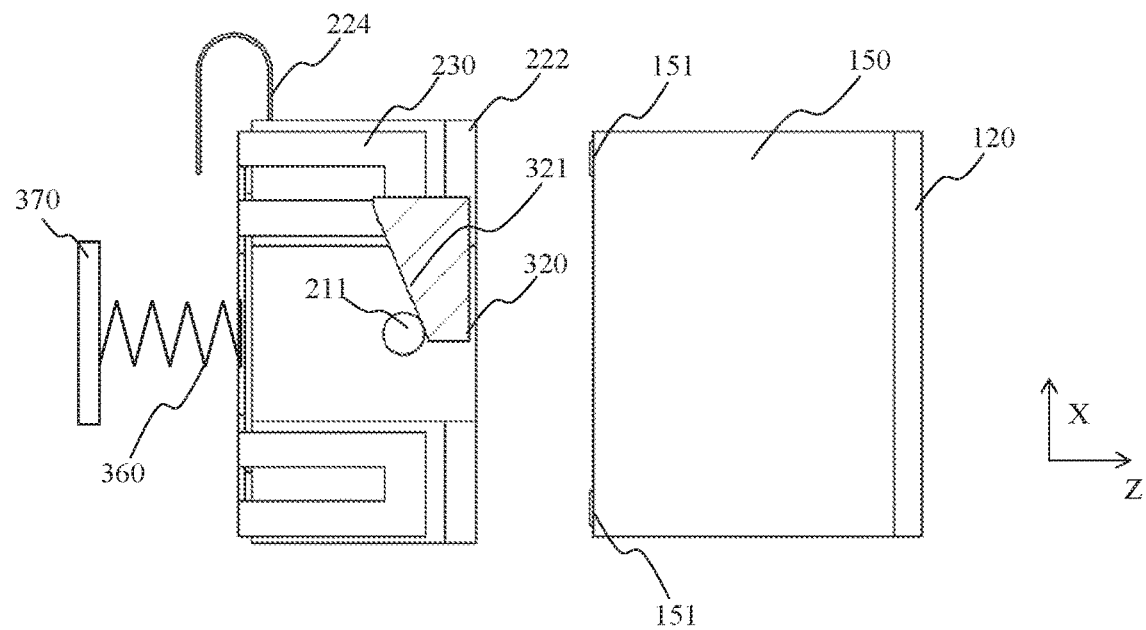

Referring now to FIGS. 3A to 6B, a description will be given of an operation of the electronic viewfinder unit 1000. FIGS. 3A and 3B illustrate a retracted state of the electronic viewfinder unit 1000, FIGS. 4A and 4B illustrate a plus (positive) diopter state, FIGS. 5A and 5B illustrate a reference diopter state, and FIGS. 6A and 6B illustrate a minus (negative) diopter state, respectively. In each figure, A represents a YZ section and B presents an XZ section of the electronic viewfinder unit 1000. The states illustrated in FIGS. 4A and 4B, 5A and 5B, and 6A and 6B will be collectively referred to as a use state (or an observable state of the finder image).

Figure 3B:
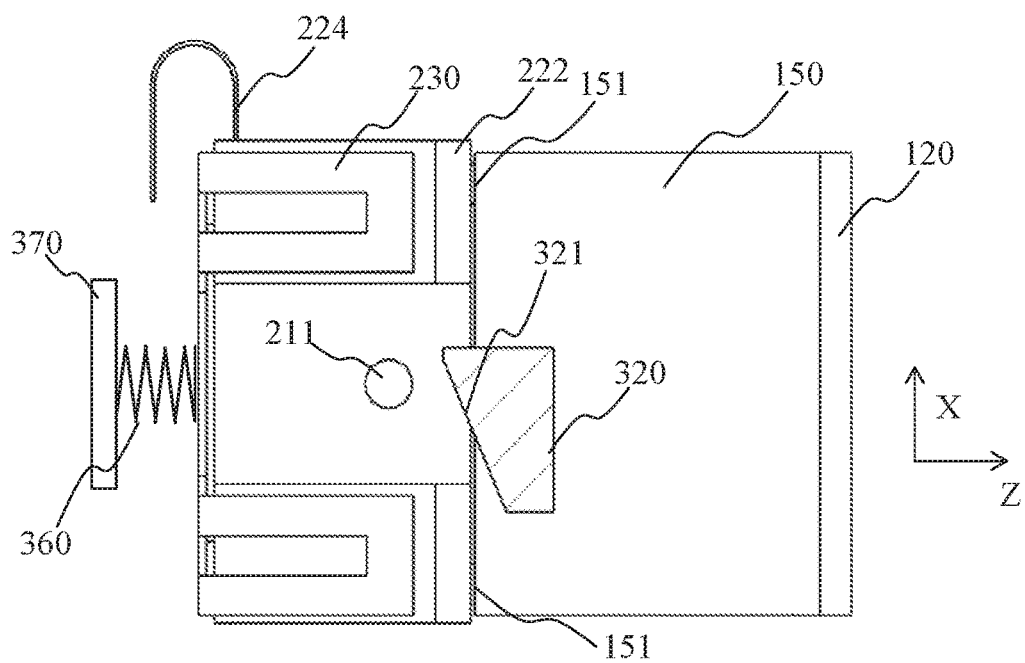

In both the retracted state illustrated in FIGS. 3A and 3B and the use state illustrated in FIGS. 4A to 6B, the panel unit 200 is forced by a forcing member 360 fixed to a fixing member 370 toward the lens unit 100 side (eyepiece optical system side). In the retracted state shown in FIGS. 3A and 3B, the lens unit 100 and the panel unit 200 are in the retracted state (at a first position or a retracted position) so that a contact portion 151 provided on the lens holder 150 contacts a panel holder 210. At this time, the panel unit 200 is retracted with the lens unit 100 in a squeezed state against the force by the forcing member 360.

In the retracted state, a follower portion 211 provided to the panel holder 210 and a cam portion 321 in the cam member 320 are spaced from each other in the Z direction.

Figure 4A:
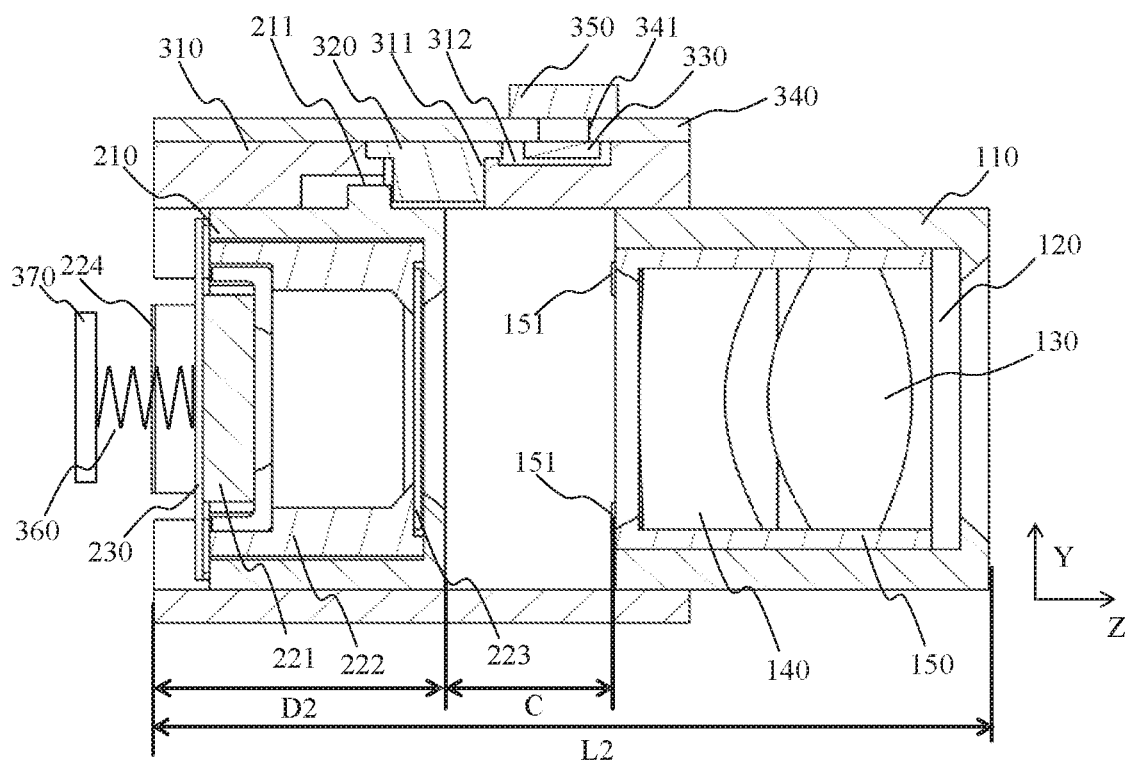
FIGS. 4A and 4B are sectional views of the electronic viewfinder unit in a plus (positive) diopter state.
Figure 4B:
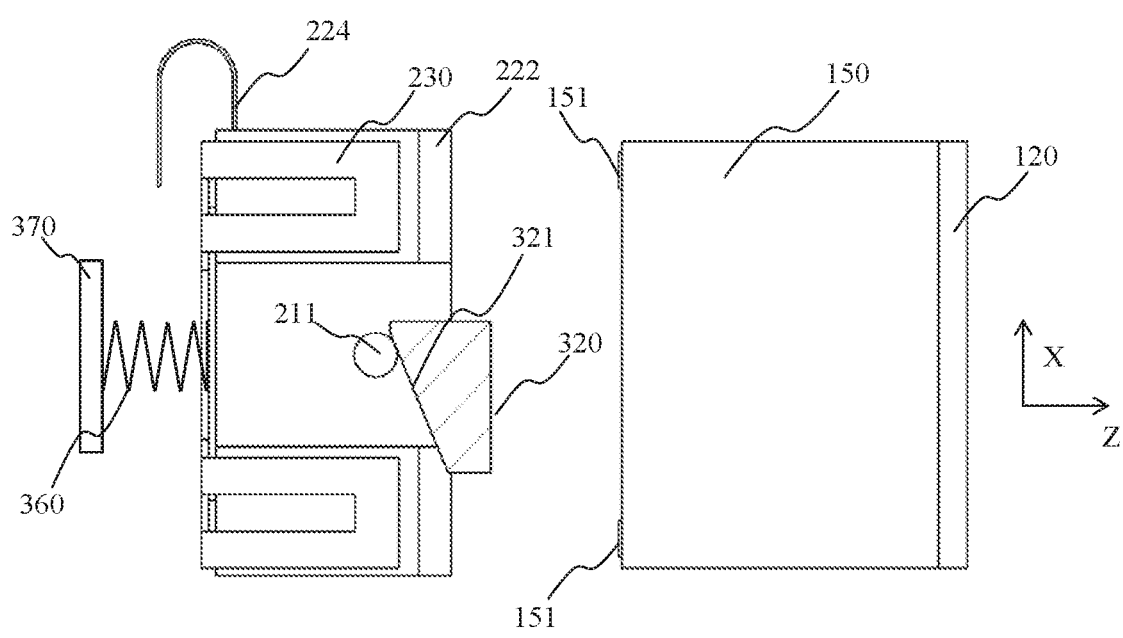
Figure 5A:
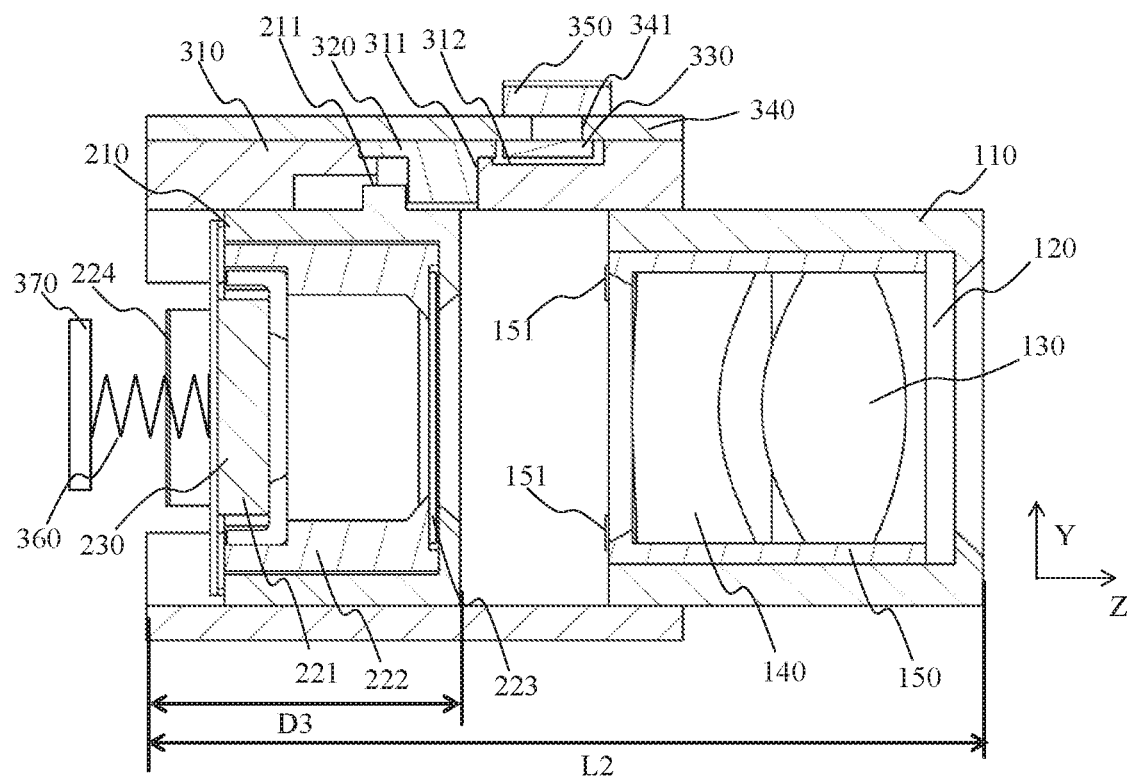
FIGS. 5A and 5B are sectional views of the electronic viewfinder unit in a reference diopter state.
Figure 5B:
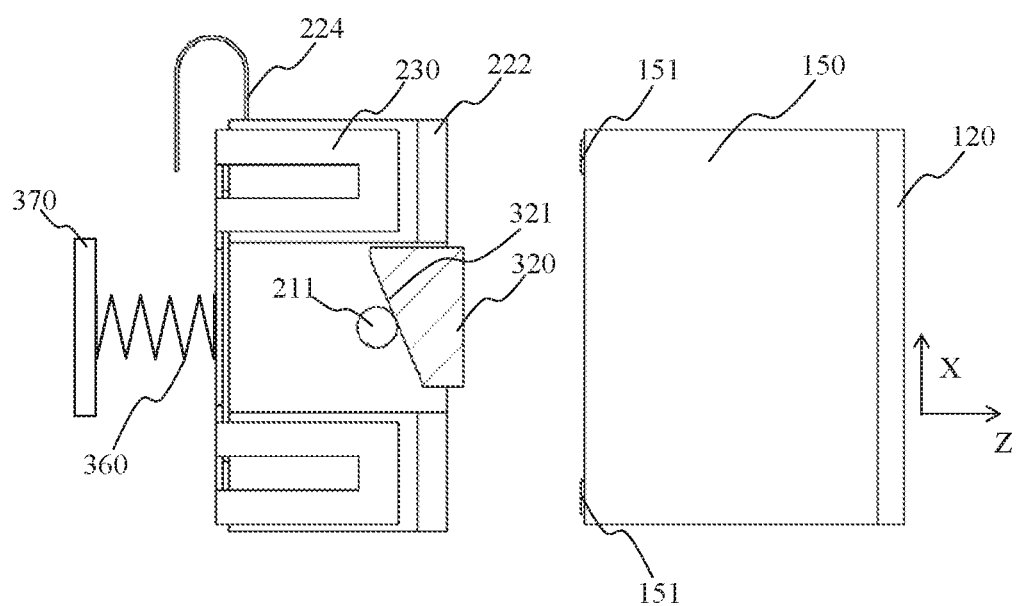

When the lens unit 100 is drawn out of the base member 310 from the state illustrated in FIGS. 3A and 3B to the state illustrated in FIGS. 4A and 4B, the lens cover 110 contacts an unillustrated stopper part provided onto the base member 310. In this state, the lens unit 100 (lenses 130 and 140) protrudes significantly from the camera body further than the state illustrated in FIGS. 3A and 3B. As the lens unit 100 is drawn, the panel unit 200 is moved by the force of the forcing member 360 until the follower portion 211 of the panel holder 210 contacts the cam portion 321 of the cam member 320. Thereby, the lens unit 100 and the panel unit 200 are located at the use position (second position). In the state illustrated in FIGS. 4A and 4B, the lens unit 100 and the panel unit 200 are most distant from each other in the Z direction, and the plus diopter state is obtained.

In order to obtain the state of FIG. 5A and 5B or 6A and 6B for the diopter adjustment from the state of FIGS. 4A and 4B, the user operates the lever member 350 in the X direction. As the lever member 350 moves in the X direction, the slider 330 and the cam member 320 integrally move in the X direction. Since the follower portion 211 of the panel holder 210 is pressed against the cam portion 321 of the cam member 320 by the force of the forcing member 360, the follower portion 211 moves in the Z direction due to the lift of the cam portion 321. The panel unit 200 moves in the Z direction, and a distance becomes longer between the panel unit 200 (the image display panel 221) and the lens unit 100 (the lenses 130 and 140). This configuration sets the reference diopter state illustrated in FIGS. 5A and 5B or the minus (negative) diopter state illustrated in FIGS. 6A and 6B.

In order to move the lens unit 100 and the panel unit 200 from the use position to the retracted position, the user pushes the lens unit 100 to the panel unit side (the front side opposite to the forcing direction by the forcing member 360). While the lens unit 100 is squeezed, the contact portion 151 of the lens holder 150 contacts the panel holder 210, and thereafter while the forcing member 360 is deformed toward the panel unit side or to the retracted position against the force by the forcing member 360.

The retracted position of the panel unit 200 is located in front of a position closest to the retracted position among the use position (the position where the follower portion 211 contacts the cam portion 321) which is variable by the diopter adjustment. The follower portion 211 of the panel unit 200 is spaced from the cam part 321. In order to move the panel unit 200 from the use position to the retracted position, the panel unit 200 is pushed by the lens unit 100 to the retracted position, and the panel unit 200 is held at the retracted position in contact with the lens unit 100. Since it is unnecessary to manipulate or move the lever member 350 in moving the panel unit 200 from the use position to the retracted position, the panel unit 200 can be retracted while the use position of the diopter-adjusted panel unit 200 is saved. As a result, the diopter adjustment is unnecessary whenever the electronic viewfinder unit 1000 is used.

Assume that D1 is a distance from a front end of the base member 310 to a rear end of the panel cover 230 in the retracted state and D2 is the corresponding distance in the use state (plus diopter state) illustrated in FIGS. 4A and 4B. Then, from the retracted state to the use state, the panel unit 200 moves in the Z direction by $\Delta D = D2 - D1$. The cam member 320 illustrated in FIGS. 3A, 3B, 4A, and 4B has the same position in the X direction. Assume that D3 is a distance from the front end of the base member 310 to the rear end of the panel holder 210 in the use state (reference diopter state) illustrated in FIGS. 5A and 5B, and D4 is a distance from the front end of the base member 310 to the rear end of the panel holder 210 in the use state (minus diopter state) illustrated in FIGS. 6A and 6B. Then, the following relationship is established:

$$D4 > D3 > D2$$

Since a distance C between the lens unit 100 and the panel unit 200 in the use state illustrated in FIGS. 4A and 4B is determined by an optical design, it is necessary to move the lens unit 100 by the same $\Delta D$ as the panel unit 200. Assume that L1 is a distance from the front end of the base member 310 to the rear end of the lens cover 110 in the retracted state illustrated in FIGS. 3A and 3B, and L2 is a distance from the front end of the base member 310 to the rear end of the lens cover 110 in the use state illustrated in FIGS. 4A and 4B (and FIGS. 5A, 5B, 6A, and 6B). Then, the following expression is met:

$$\Delta L = L2 - L1 = C + \Delta D$$

Conventionally, in changing the retracted state to the use state, the lens unit 100 can be drawn out only by the distance corresponding to the distance C. On the other hand, this embodiment can draw the lens unit 100 by a distance longer than $\Delta D$ by moving the panel unit 200 by $\Delta D$.

This embodiment adjusts the diopter by moving the panel unit 200, but may move the lens unit 100 for the diopter adjustment. The use positions of the lens unit 100 and the panel unit 200 (or their projection amounts from the camera body) may be variable.

Figure 7:
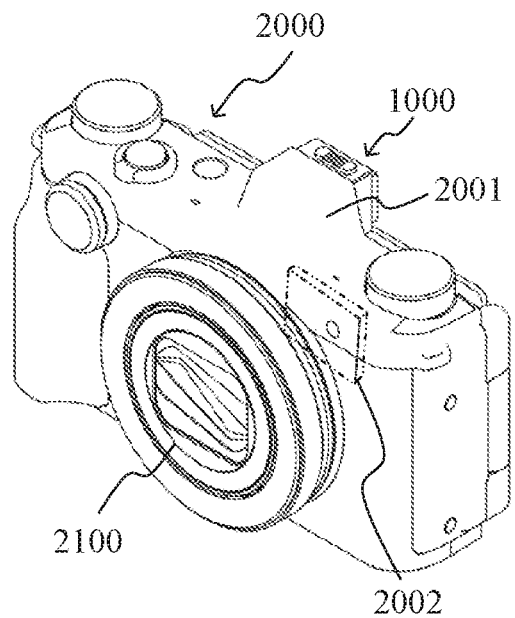
FIG. 7 is a front perspective view of the camera.
Figure 8:
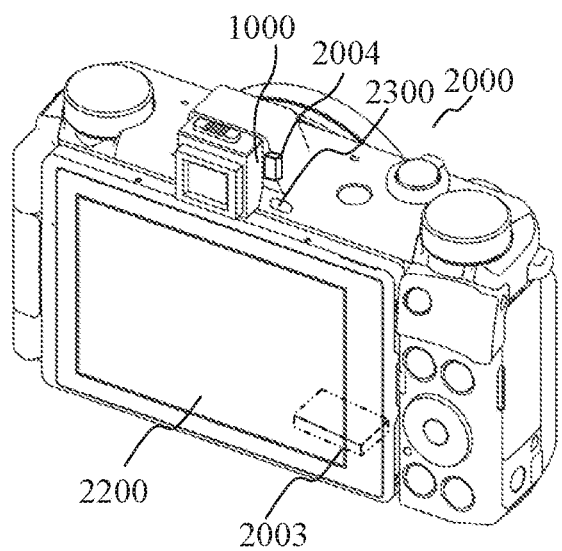
FIG. 8 is a rear perspective view of the camera while the electronic viewfinder unit is retracted.
Figure 9:
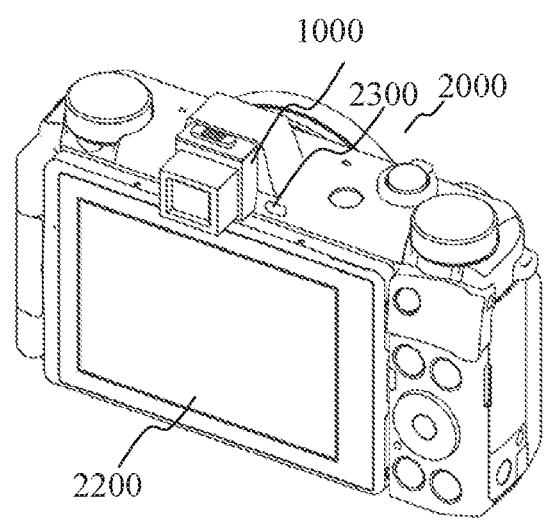
FIG. 9 is a rear perspective view of the camera while the electronic viewfinder unit is in use.

Referring now to FIGS. 7 to 9, a description will be given of a camera 2000 that includes the above electronic viewfinder unit 1000. FIG. 7 is a front perspective view of the camera 2000, and FIG. 8 is a back perspective view of the camera 2000 where the electronic viewfinder unit 1000 is retracted (a viewfinder retracted state hereinafter). FIG. 9 is a back perspective view of the camera 2000 while the electronic viewfinder unit 1000 is in the use state (a viewfinder use state hereinafter).

Reference numeral 2100 denotes a lens barrel that includes a plurality of unillustrated lenses. FIG. 7 illustrates a retracted state in which the lens barrel 2100 is retracted in the camera body 2001. An image sensor 2002 is provided in the camera body 2001. The image sensor 2002 is used to generate an electronic image (a captured image or a finder image) by capturing an object image formed by the lens barrel 2100. Reference numeral 2200 denotes a back monitor as an external image display panel provided on the back of the camera body 2001, which displays a live-view image and a captured image similar to the finder image.

Reference numeral 2300 denotes an eyepiece sensor (eyepiece or ocular detector) including an infrared light emitting element and an infrared light receiving element. In the finder retracted state illustrated in FIG. 8, a camera microcomputer 2003 as a controller illustrated in FIG. 8 detects the illuminance of external light through the light receiving element in the eyepiece sensor 2300. The camera microcomputer 2003 adjusts the brightness of the image displayed on the back monitor 2200 according to the detected illuminance. In other words, this embodiment also uses the eyepiece sensor 2300 as an illuminance sensor.

In the finder use state illustrated in FIG. 9, the eyepiece sensor 2300 can detect the peep (or eye set) in which the infrared light emitted from the infrared light emitting element, reflected by the face of the user, and received by the light receiving element when the eye of the user approaches to the eyepiece part. As the eyepiece sensor 2300 detects the peep, the camera computer 2003 switches the image display on the back monitor 2200 to the image display on the electronic viewfinder unit 1000 (image display panel 221). On the other hand, when the peep is not detected, the camera microcomputer 2003 switches the image display on the electronic viewfinder unit 1000 to the image display on the back monitor 2200.

The camera body 2001 includes, as shown in FIG. 8, a detection switch 2004 as a position detector configured to detect which of the finder retracted state (retracted position) or the finder use state (use position) the electronic viewfinder unit 1000 is set to. In accordance with the signal from the detection switch 2004, the camera microcomputer 2003 switches the eyepiece sensor 2300 between the state used to detect the illuminance of the external light and the state used to detect the eyepiece as described above. The user can comfortably observe the live-view image or the finder image by switching the eyepiece sensor 2300 between the finder retracted state and the finder use state.

The eyepiece sensor 2300 may be used only to detect the peep. Then, the camera microcomputer 2003 supplies the power to the eyepiece sensor 2300 in the finder use state, and cuts off the power supply to the eyepiece sensor 2300 in the finder retracted state. The power supply to the eyepiece sensor 2300 may be automatically resumed when the finder retracted state is changed to the finder use state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-195669, filed on Oct. 6, 2017, which is hereby incorporated by reference herein in its entirety.

What is claimed is:

1. An imaging apparatus comprising:
   an electronic viewfinder unit,
   wherein the electronic viewfinder unit includes:
   an image display element configured to display an image;
   an eyepiece optical system configured to enable the image to be observed from a rear side of the imaging apparatus;
   a holder unit configured to hold the eyepiece optical system and the image display element;
   an element holder configured to hold the image display element and movable in an optical axis direction with the image display element; and
   a contact member configured to restrict a position of the image display element in the optical axis direction; and
   a forcing member configured to apply a force so as to bring the element holder into contact with the contact member,
   wherein the holder unit moves the eyepiece optical system from a retracted position in which the eyepiece optical system is retracted in a body of the electronic viewfinder unit to an observable position in which the eyepiece optical system projects from the body of the electronic viewfinder unit to the rear side from the retracted position, and moves the image display element to the rear side.

2. The imaging apparatus according to claim 1, wherein the eyepiece optical system moves from the observable position to the retracted position while deforming the forcing member in a direction opposite to a forcing direction of the element holder.

3. The imaging apparatus according to claim 1, wherein when the eyepiece optical system located at the retracted position, the element holder and the contact member are spaced from each other in the optical axis direction.

4. An imaging apparatus comprising:
an electronic viewfinder unit,
wherein the electronic viewfinder unit includes:
  an image display element configured to display an image;
  an eyepiece optical system configured to enable the image to be observed from a rear side of the imaging apparatus; and
  a holder unit configured to hold the eyepiece optical system and the image display element,
  wherein the holder unit moves the eyepiece optical system from a retracted position in which the eyepiece optical system is retracted in a body of the electronic viewfinder unit to an observable position in which the eyepiece optical system projects from the body of the electronic viewfinder unit to the rear side from the retracted position, and moves the image display element to the rear side;
  an eyepiece detector configured to detect a peep of a user through the eyepiece optical system;
  a position detector configured to detect which of the retracted position and the observable position the eyepiece optical system is set to; and
  a controller configured to detect the peep through the eyepiece detector when the eyepiece optical system is located at the observable position and to detect an illuminance of external light through the eyepiece detector when the eyepiece optical system is located at the retracted position.

5. An imaging apparatus comprising:
an electronic viewfinder unit,
wherein the electronic viewfinder unit includes:
  an image display element configured to display an image;
  an eyepiece optical system configured to enable the image to be observed from a rear side of the imaging apparatus; and
  a holder unit configured to hold the eyepiece optical system and the image display element,
  wherein the holder unit moves the eyepiece optical system from a retracted position in which the eyepiece optical system is retracted in a body of the electronic viewfinder unit to an observable position in which the eyepiece optical system projects from the body of the electronic viewfinder unit to the rear side from the retracted position, and moves the image display element to the rear side;
  an eyepiece detector configured to detect a peep of a user through the eyepiece optical system;
  a position detector configured to detect which of the retracted position and the observable position the eyepiece optical system is set to; and
  a controller configured to supply power to the eyepiece detector when the eyepiece optical system is located at the observable position, and to cut off a power supply to the eyepiece optical system when the eyepiece optical system is located at the retracted position.

6. The imaging apparatus according to claim 1, wherein an optical component in the eyepiece optical system closest to an eyepiece side has a lens shape.

* * * * *